(12) United States Patent
Lawandy

(10) Patent No.: US 6,795,464 B2
(45) Date of Patent: Sep. 21, 2004

(54) TEMPERATURE CONTROL OF LASER ACTION IN SCATTERING MEDIA

(75) Inventor: Nabil M. Lawandy, North Kingstown, RI (US)

(73) Assignee: Spectra Systems Corporation, Providence, RI (US)

( * ) Notice: Subject to any disclaimer, the term of this patent is extended or adjusted under 35 U.S.C. 154(b) by 213 days.

(21) Appl. No.: 10/263,060

(22) Filed: Oct. 1, 2002

(65) Prior Publication Data

US 2003/0165174 A1 Sep. 4, 2003

Related U.S. Application Data

(60) Provisional application No. 60/340,038, filed on Dec. 10, 2001.

(51) Int. Cl.[7] .............................. H01S 3/14; H01S 3/091
(52) U.S. Cl. .............................. 372/39; 372/70; 372/53
(58) Field of Search .............................. 372/39, 51, 53, 372/70

(56) References Cited

U.S. PATENT DOCUMENTS

| | | | |
|---|---|---|---|
| 4,722,595 A | 2/1988 | Siol | 350/353 |
| 4,965,783 A | 10/1990 | Siol et al. | 369/100 |
| 5,005,176 A | 4/1991 | Lam et al. | 372/10 |
| 5,434,878 A | 7/1995 | Lawandy | 372/43 |
| 5,448,582 A | 9/1995 | Lawandy | 372/42 |
| 5,488,620 A | 1/1996 | Minden | 372/18 |
| 5,625,456 A * | 4/1997 | Lawandy | 356/601 |
| 5,770,528 A | 6/1998 | Mumick et al. | 442/59 |
| 5,903,340 A | 5/1999 | Lawandy et al. | 356/71 |
| 5,943,354 A * | 8/1999 | Lawandy | 372/39 |
| 6,030,411 A | 2/2000 | Lawandy | 607/88 |
| 6,088,380 A | 7/2000 | Lawandy | 372/102 |
| 6,100,973 A | 8/2000 | Lawandy | 356/246 |
| 6,290,988 B1 | 9/2001 | Van Vilsteren et al. | 424/451 |
| 6,530,944 B2 | 3/2003 | West et al. | 607/88 |
| 6,656,588 B1 * | 12/2003 | Laine et al. | 428/402 |

FOREIGN PATENT DOCUMENTS

WO        WO-00/38283 A1    6/2000

OTHER PUBLICATIONS

Applied Optics, R.M. Balachandran, et al., "Photonic Textile Fibers", Apr. 20, 1996, vol. 35, No. 12.

The American Physical Society, H. Cao, et al., "Random Laser Action in Semiconductor Powder", vol. 82, No. 11, Mar. 15, 1999.

Soviet Physics JETP, V.S. Letokhov, "Generation of Light by a Scattering Medium with Negative Resonance Absorption", vol. 26, No. 4, Apr., 1968.

Dalichaouch, R., Armstrong, J.P., Schultz, S., Platzman, P.M., & McCall, S.L.; "Microwave Localization by Two–Dimensional Random Scattering"; Letters to Nature; vol. 354, pp. 53–55, Nov. 7, 1991.

Sparenberg, A., Rikken, G. & van Tiggelen, B.A.; "Observation of Photonic Magnetoresistance"; The American Physical Society—Physical Review Letters; vol. 79, No. 4, pp. 757–760 (1997).

Scheffold, F. & Maret, G.; "Universal Conductance Fluctuations of Light"; The American Physical Society—Physical Review Letters; vol. 81, No. 26, pp. 5800–5803 (1998).

(List continued on next page.)

*Primary Examiner*—Don Wong
*Assistant Examiner*—James Menefee
(74) *Attorney, Agent, or Firm*—Harrington & Smith, LLP

(57) ABSTRACT

A random laser system includes Critical Solution Temperature (CST) material, either a Lower CST (LCST) or an Upper CST (UCST) material, in combination with an optical gain medium, such as a laser dye. A laser-like emission is observed in response to optical pumping only when the CST material is in a scattering state. The random laser is suitable for being microencapsulated, and can be used for, as examples, remote temperature sending applications as well as for visual display applications.

28 Claims, 4 Drawing Sheets-

OTHER PUBLICATIONS

Gouedard, C., Husson, D., & Sauteret, C.; "Generation of Spatially Incoherent Short Pulses in Laser–Pumped Neodymium Stoichiometric Crystals and Powders"; Optical Society of America; vol. 10, No. 12, pp. 2358–2363; Dec. 1993.

Wiersma, D.S. & Lagendijk, A.; "Light Diffusion with Gain and Random Lasers"; vol. 54, No. 4, pp. 4256–4265; Oct. 1996.

Lawandy, N.M., Balachandran, R.M., Gomes, A.S.L., & Sauvain, E.; "Laser Action in Strongly Scattering Media"; Letters to Nature; vol. 368, pp. 436–438, Mar. 31, 1994.

Balachandran, R.M., Perkins, A.E., & Lawandy, N.M.; "Injection Locking of Photonic Paint"; Optical Society of America—Optics Letters, vol. 21, No. 9, pp. 650–652, May 1, 1996.

De Oliveira, P.C., Perkins, A.E., & Lawandy, N.M.; "Coherent Backscattering from High–Gain Scattering Media"; Optical Society of America—Optic Letters; vol. 21, No. 20, pp. 1685–1687, Oct. 15, 1996.

Balachandran, R.M. & Lawandy, N.M.; "Understanding Bichromatic Emission from Scattering Gain Media"; Optical Society of America—Optics Letters; vol. 21, No. 19, pp. 1603–1605, Oct. 1, 1996.

Lawandy, N.M.; "Paint–On Lasers' Light the Way for New Technologies"; Photonics Spectra; pp. 119–124, Jul. 1994.

Balachandran, R.M. & Lawandy, N.M.; "Theory of Laser Action in Scattering Gain Media"; Optical Society of America—Optics Letters; vol. 22, No. 5, pp. 319–321, Mar. 1, 1997.

Busch, K. & John, S.; "Liquid–Crystal Photonic–Band–Gap Materials: The Tunable Electromagnetic Vacuum"; The American Physical Society—Physical Review Letters; vol. 83, No. 5, pp. 967–970, Aug. 2, 1999.

Gao, J., Haidar, G., Lu, X., & Hu, Z.; "Self–Assocation of Hydroxyproplcellulose in Water"; American Chemical Society; vol. 34, No. 7, pp. 2242–2247 (2001).

* cited by examiner

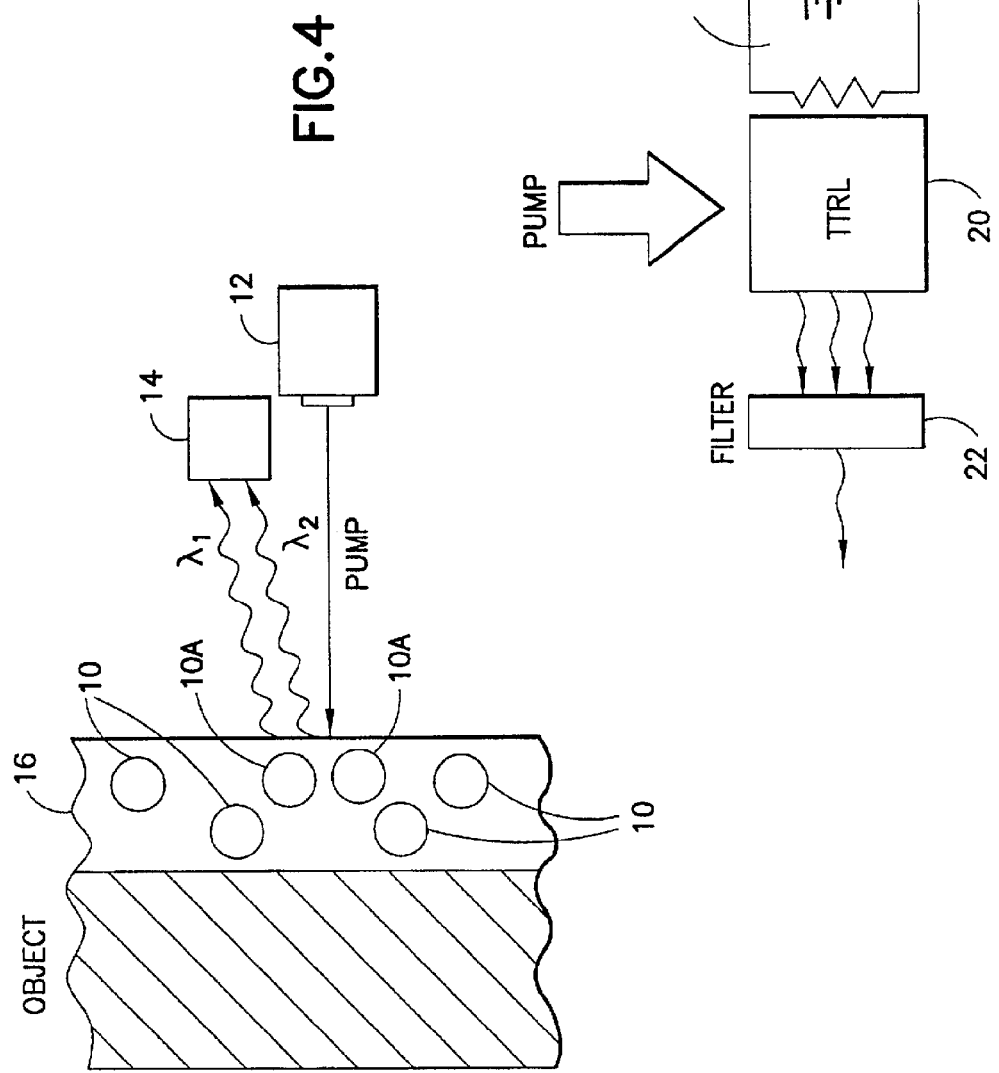

TEMPERATURE CONTROL OF LASER ACTION IN SCATTERING MEDIA

CLAIM OF PRIORITY FROM A COPENDING U.S. PROVISIONAL PATENT APPLICATION

This patent application claims priority under 35 U.S.C. 119(e) from Provisional Patent Application No. 60/340,038, filed on Dec. 10, 2001, and incorporated by reference herein in its entirety.

TECHNICAL FIELD

These teachings relate generally to the generation of laser action in scattering media and, more specifically, to the use of random laser action for remote sensing and other applications.

BACKGROUND

Various physical phenomena associated with the multiple scattering of electrons have been known for some time. Over the past several years optical analogs of these phenomena have been observed, as reported by Dalichaouch, R., Armstrong, J. P., Schultz, S., Platzman, P. M. & McCall, S. L. Microwave Localization by 2-Dimensional Random Scattering. *Nature* 354, 53 (1991); Sparenberg, A., Rikken, G. & van Tiggelen, B. A. Observation of photonic magnetoresistance. *Physical Review Letters* 79, 757 (1997); and Scheffold, F. & Maret, G. Universal conductance fluctuations of light. *Physical Review Letters* 81, 5800 (1998).

In addition to these effects, it was predicted in 1968 that multiple scattering of light in the presence of amplification could lead to an instability and laser-like emission, Letokhov, V. S. *Sov. Phys. JETP* 26, 835 (1968). Such an experimental situation was realized in a number of physical forms included use of powdered laser crystals: Gouedard, C., Husson, D., Sauteret, C., Auzel, F. & Migus, A. Generation of Spatially Incoherent Short Pulses in Laser-Pumped Neodymium Stoichiometric Crystals and Powders. *Journal of the Optical Society of America B-Optical Physics* 10, 2358 (1993), Wiersma, D. S. & Lagendijk, A. Light diffusion with gain and random lasers. *Physical Review E* 54, 4256 (1996), and high gain laser dyes in combination with various scattering media: Lawandy, N. M., Balachandran, R. M., Gomes, A. S. L. & Sauvain, E. Laser Action in Strongly Scattering Media (Vol 368, Pg 436, 1994). *Nature* 369, 340 (1994). Most recently, experiments using zinc-oxide powders have provided evidence for random laser action in the presence of Anderson localization: Cao, H. et al. Random laser action in semiconductor powder. *Physical Review Letters* 82, 2278 (1999). Considerable experimental work on the physical mechanisms and possible uses of the random laser action followed the discovery of the dye based system. Examples of research into this area are found in the following articles: Balachandran, R. M., Perkins, A. E. & Lawandy, N. M. Injection Locking of Photonic Paint. *Optics Letters* 21, 650 (1996); de Oliveira, P. C., Perkins, A. E. & Lawandy, N. M. Coherent Backscattering from High Gain Scattering Media. *Optics Letters* 21, 1685 (1996); Balachandran, R. M. & Lawandy, N. M. Understanding Bichromatic Emission from Scattering Gain Media. *Optics Letters* 21, 1603 (1996). Notably, the inventor was a contributor to each of these articles. Potential applications include identification, remote sensing, displays, and photodynamic therapy, to name a few (see, for example, Balachandran, R. M., Pacheco, D. P. & Lawandy, N. M. Photonics Textile Fibers. *Applied Optics* 35, 1991 (1996); and Lawandy, N. M. 'Paint-On Lasers' Light the Way for New Technologies. *Photonics Spectra* 28, 119 (1994).

Reference can also be had to the following U.S. Patents, wherein the present inventor is either the sole inventor or a co-inventor: U.S. Pat. No. 6,100,973, Methods and apparatus for performing microanalytical techniques using photolithographically fabricated substrates having narrow band optical emission capability; U.S. Pat. No. 6,088,380, Method and apparatus for intracavity pixelated lasing projection; U.S. Pat. No. 6,030,411 Photoemitting catheters and other structures suitable for use in photo-dynamic therapy and other applications; U.S. Pat. No. 5,903,340, Optically-based methods and apparatus for performing document authentication; U.S. Pat. No. 5,448,582, Optical sources having a strongly scattering gain medium providing laser-like action; and U.S. Pat. No. 5,434,878, Optical gain medium having doped nanocrystals of semiconductors and also optical scatterers.

Motivated by the number of such applications, interest has grown in methods to externally control the random laser line-width, intensity, and emission wavelength. The wavelength can be controlled by mechanisms that affect the chromophore emission wavelength, while the line-width and intensity are most directly affected by the sample volume and the scattering length of the active medium. This was previously presented by the inventor and others: Balachandran, R. M., Lawandy, N. M. & Moon, J. A. Theory of Laser Action in Scattering Gain Media. *Optics Letters* 22, 319 (1997). Tuning of the output wavelength of a random laser has been demonstrated using a dye dissolved in a polymethylmethacrylate matrix. The 5 nm wide emission could be tuned by over 30 nm and was observed to be linear from 77K to 380K with a slope of approximately 0.09 nm/K, as described in International Patent Application No.: WO 00038283.

It has been proposed to use liquid crystals to control the properties of photonic bandgap crystals, as discussed by Busch, K. & John, S. Liquid-crystal photonic-band-gap materials: The tunable electromagnetic vacuum. *Physical Review Letters* 83, 967 (1999). This approach relies on the different optical properties of the various partially ordered liquid crystal phases that exist at various temperatures. The most dramatic effect on the scattering length occurs with the transition from the birefringent nematic phase to the isotropic phase. Unfortunately, the use of this approach for controlling a random laser is limited by the solubility of laser dyes in liquid crystal materials, requires a solid host structure and has a very small range of scattering length variation. This latter parameter is the critical factor in determining the threshold, linewidth, and output of the random laser.

SUMMARY OF THE PREFERRED EMBODIMENTS

The foregoing and other problems are overcome, and other advantages are realized, in accordance with the presently preferred embodiments of these teachings.

A random laser system includes Critical Solution Temperature (CST) material, either a Lower CST (LCST) or an Upper CST (UCST) material, in combination with an optical gain medium, such as a laser dye. A laser-like emission is observed in response to optical pumping only when the CST material is in a scattering state. The random laser is suitable for being microencapsulated, and can be used for, as examples, remote temperature sending applications as well as for visual display applications.

A system is disclosed for creating a random laser media, where the scattering wavelength predictably relates to the temperature of the media. This invention may be used in a variety of applications, such as for the remote sensing of temperature. A preferred embodiment of this invention employs a LCST material as a scattering phase, in combination with an optical gain medium that includes a dye, such as a laser dye.

In a preferred, but non-limiting, embodiment of this invention a random laser action media is formed from a combination of hydroxypropyl cellulose (HPC) as the LCST material and the laser dye known as Kiton Red 620, where the laser dye is dissolved into the HPC. The resulting random laser action media exhibits a temperature dependent shift in scattering wavelength that is both predictable and reproducible.

In accordance with these teachings a random laser is provided within a container that contains an optical gain medium in combination with a LCST material. The random laser, when pumped by an external source, has an emission that exhibits laser characteristics only when a temperature within the container is above the LCST of the LCST material.

The container may be a capsule having a size of microns or tens of microns, and a plurality of such capsules can be disposed within a coating upon an object. In another embodiment an optical filter can be used, and the emission passes through the optical filter. The gain medium may be a laser dye, and the LCST material may comprise an aqueous hydroxypropyl cellulose (HPC) system.

A method is also disclosed for remotely sensing the temperature of an object. The method includes providing the object with a random laser action medium, where the medium comprises a laser dye and LCST material and exhibits a dependence of laser emission upon temperature; interrogating the object by irradiating the random laser action medium with a pump laser beam for inducing an emission from the random laser action medium; detecting the emission; and correlating at least one characteristic of the emission with the temperature of the object. The emission characteristic may include linewidth, emission strength and/or line center emission strength.

A display in accordance with an embodiment of this invention has a plurality of pixels, where each pixel includes an optical gain medium in combination with a CST material that, when pumped by an optical source, has an emission that exhibits a change in an emission characteristic as a function of temperature. The display further includes a thermal energy source for varying the temperature of each pixel individually to be above or below the CST of the CST material, depending on whether the pixel is intended to be on or off.

Also disclosed is a method for operating a random laser action medium. This method includes providing the medium so as to include an optical emitter material, such as a laser dye, and a CST material; illuminating the medium with light for causing the optical emitter to emit photons; and reversibly controlling the photon scattering length and the photon diffusion time in the medium in accordance with the temperature of the medium for controlling an optical emission characteristic of the medium. The optical emission characteristic can be one or more of linewidth, emission strength and line center emission strength.

Another embodiment of this invention employs the Upper Critical Solution Temperature (UCST) material as a scattering phase, in combination with an optical gain medium that includes a dye, such as a laser dye.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4 depicts capsules employed as nanoscale temperature sensing elements when illuminated by a remote laser source, where the resulting spectral linewidth narrowing above the LCST is detected by a remote detector assembly.

FIG. 5 shows the use of a random laser system, in accordance with these teachings, as a display device.

DETAILED DESCRIPTION OF THE PREFERRED EMBODIMENTS

A class of heterogeneous systems known as lower critical solution temperature (LCST) materials is suited for use in practicing this invention. These materials exhibit a temperature driven self-association of diblock or triblock polymers above a critical temperature (LCST) to form nanoparticles of chain aggregates without precipitation. In this process, polymer chain collapse accompanies chain association resulting in stable nanoscale aggregates of different sizes at different concentrations. These systems may thus in effect directly mimic the decrease in scattering length that would be created by the addition of more independent scattering particles to the random laser system.

Temperature dependent scattering is achieved using, as a non-limiting example, the well-studied aqueous hydroxypropyl cellulose (HPC) system that exhibits an LCST of approximately 41° C. The LCST of these systems can be controlled by chemical structure modification, such as the degree of methylation of HPC polymers, as presented by Mumick, P. S. & Chang, Y. in U.S. Pat. No. 5,770,528, 1998). HPC is an alkyl-substituted cellulose derivative that, in a water solution and when heated to a temperature above the LCST, forms metastable nanoparticle aggregates with an average hydrodynamic radius ranging from 90 nm to 277 nm, over the temperature range of approximately 40.0° C. to 45.0° C., at a concentration of $5.15 \times 10^{-5}$ $g/cm^3$ Reference in this regard can be made to Gao, J., Haidar, G., Lu, X. & Hu, Z. Self-Association of Hydroxypropylcellulose in Water. *Macromolecules* 34,2242 (2001). By heating a dilute HPC and water solution to temperatures above the LCST, a clear solution can be transformed into a milky white colloid with an increasingly narrow size distribution at higher temperatures. Decreasing the temperature below the LCST results in a return to the transparent state. Using this system, and in accordance with the teachings herein, it becomes possible to reversibly control the photon scattering length and the photon diffusion time in the medium.

EXAMPLE

Experiments were performed using a 6.5 $mg/cm^3$ solution of HPC with a nominal molecular weight of approximately 370,000 in deionized water. After 12 hours of stirring and filtering, the clear solution was poured into a 1 mm thick temperature controlled glass cuvette (container). The temperature of the solution was controlled by a heat bath to an accuracy of within 0.1° C. The scattering attenuation of a He—Ne (wavelength=632.8 nm) laser propagating through the 1 mm cuvette is shown in FIG. 1.

Figure 1:
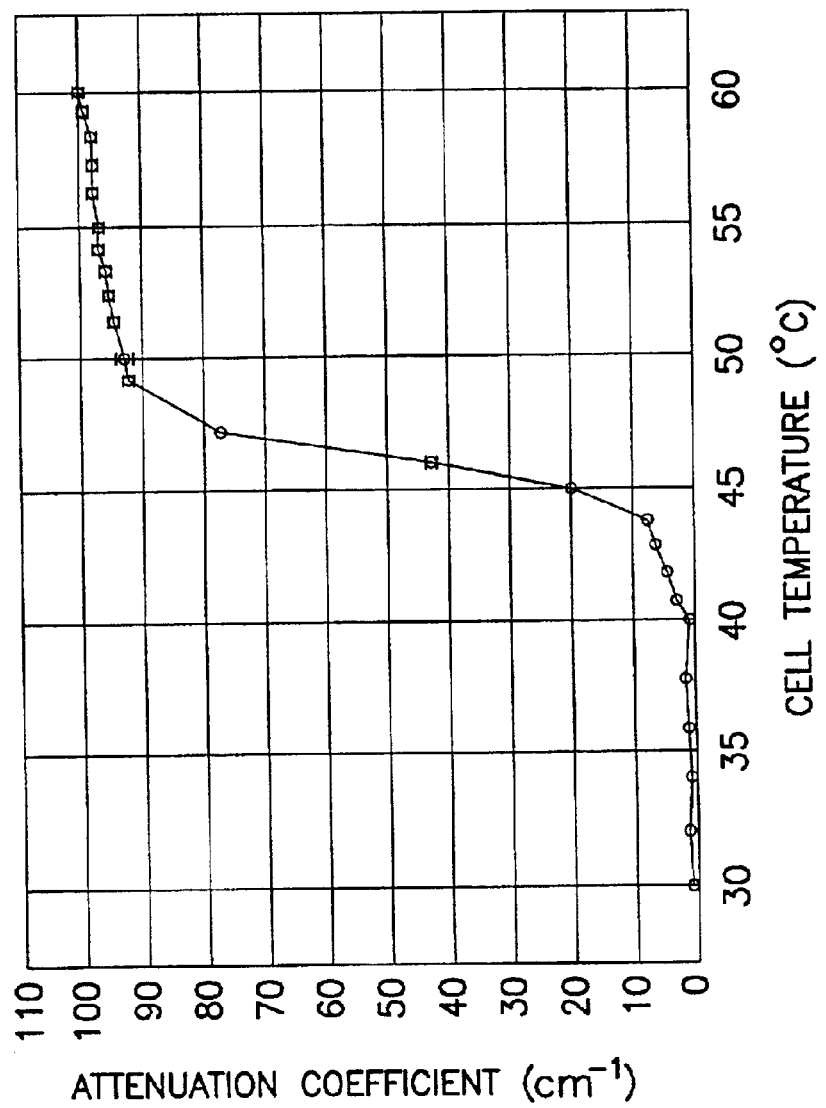
FIG. 1 is graphical depiction of the attenuation coefficient as a function of temperature.

More specifically, FIG. 1 shows the attenuation coefficient of 20.2 mg/cm$^3$ HPC/water solution measured at 632.8 nm wavelength. Each data point is represented by an empty circle, with error-bars representing the range of fluctuation. The attenuation begins to increase at about 41° C., which exactly matches the LCST of this solution.

In this embodiment, the gain of the temperature controlled random laser system was provided by dissolving the exemplary laser dye, Kiton Red 620 (available from Exciton Inc.), into the HPC and water mixture. Because water makes an excellent solvent for many laser dyes, dye concentrations as high as 10$^{-3}$ molar were obtained.

Figure 2:
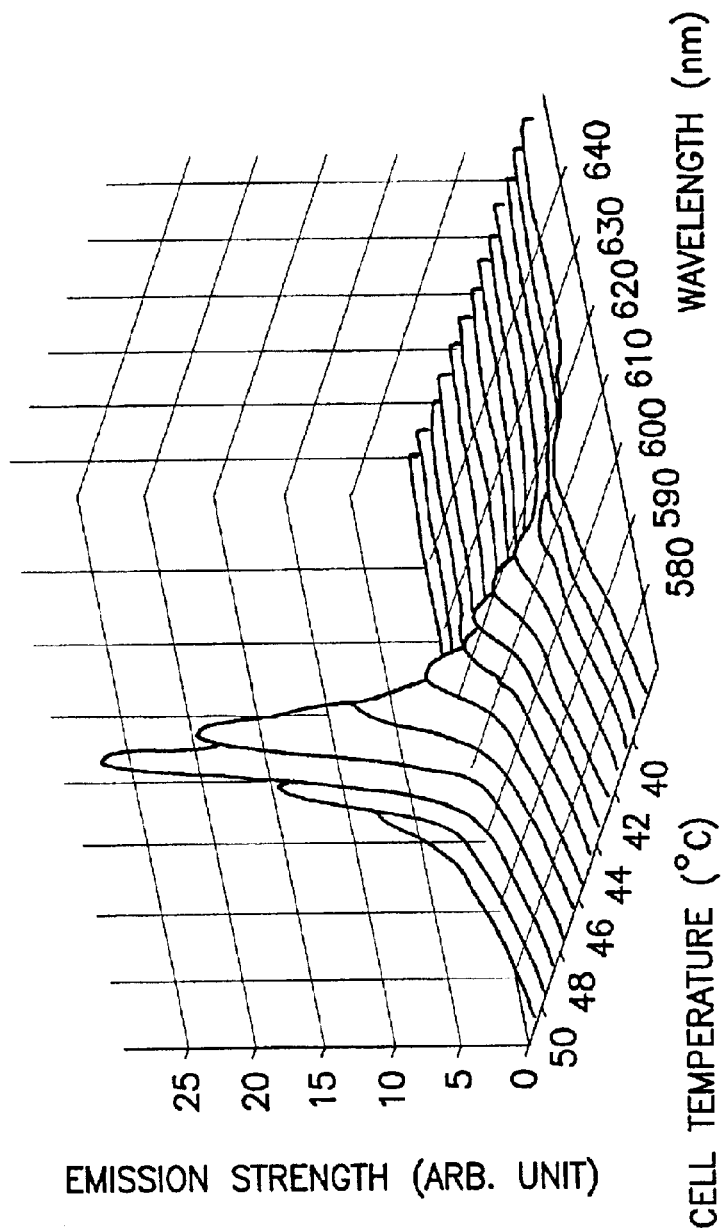
FIG. 2 is a graphical depiction of a normalized wavelength emission strength as a function of the wavelength and temperature.

The random laser containing the HPC with dissolved laser dye was excited with a fluence of 125 mJ/cm$^2$ using 7 ns long, 532 nm pulses from a frequency doubled Q-switched Nd:YAG laser. The pump energy was controlled using polarizing plates and the emitted light was collected and analyzed using a liquid nitrogen cooled CCD array spectrometer. FIG. 2 shows the dramatic line narrowing that takes place in a system with a dye concentration of 5×10$^{-3}$M as the temperature is increased through the LCST (of approximately 41° C.). This effect may be considered to represent a temperature tuning of the random laser action.

More specifically, FIG. 2 shows the emission spectra of Kiton Red 620/HPC/water solution with varying cell temperature. The cell was pumped by a 25 mJ pulse forming a 5 mm diameter spot on the cell surface. The dye concentration was 5.0×10$^{-3}$M, HPC concentration was 6.5 mg/cm$^3$, and the cell thickness was 1 mm.

Figure 3A:
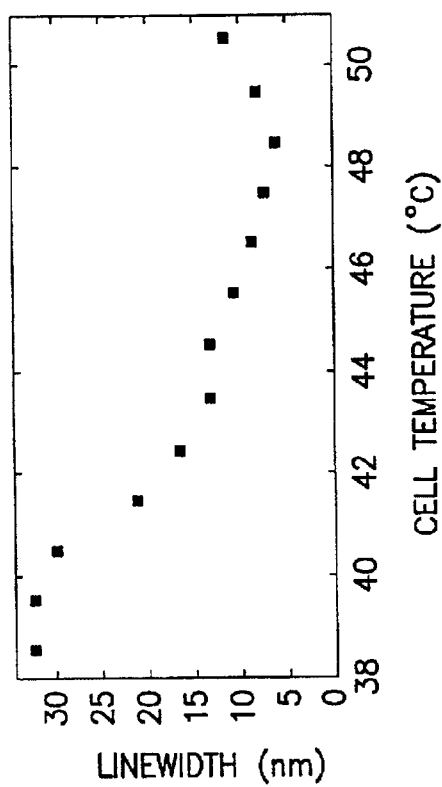
FIG. 3(a) is a graphical depiction of linewidth as a function of temperature.
Figure 3B:
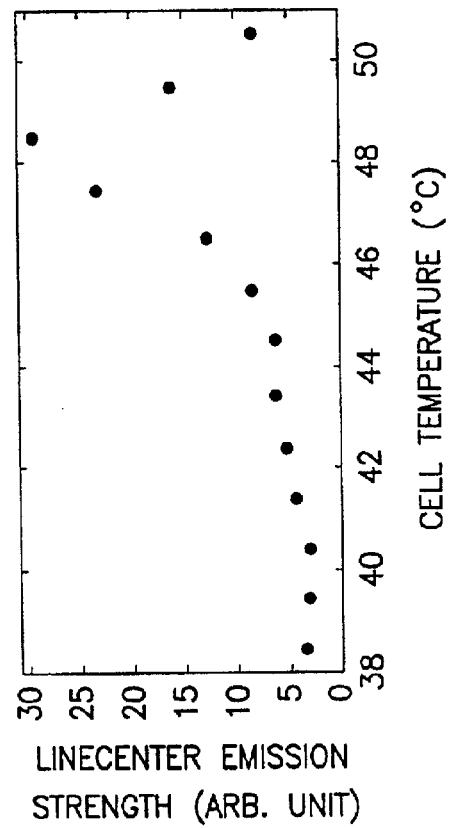
FIG. 3(b) is a graphical depiction of a normalized Line Center Emission Strength as a function of temperature.

FIG. 3($a$) and FIG. 3($b$) show the line-width and peak emission signals, respectively. While the line-width and emission strength are strongly affected by temperature, it was observed that the wavelength peak of the output was stable to within ±1 nm throughout the entire temperature range.

The data sets illustrated in FIG. 3($a$) and FIG. 3($b$) show a linewidth increase mirrored by a drop in peak emission at temperatures above approximately 48° C. This behavior has been previously observed in a conventional colloidal random laser system above a critical concentration of scatterers. The effect occurs due to a decrease in the pump volume and the pump fluence due to increased scattering. As the pump volume and gain are reduced and modified (lateral diffusion), the number of available paths for emission line narrowing and power extraction are also reduced.

The temperature tunable random laser system described herein maybe of use in a number of applications, including but not limited to the remote sensing of temperature at size scales from tens of microns to extended area volumes. Using microencapsulation methods, the LCST, dye, and solvent system can be self-contained on a scale ranging from about tens of microns to hundreds of microns. Reference can be had, for example, to U.S. Pat. No. 6,290,988 for showing the use of a hydrophobic film forming material in combination with layer of LCST material.

Referring to FIG. 4, capsules 10 can serve as nanoscale or microscale temperature sensing elements when illuminated by a remote laser source 12, such as the one described above. The resulting line narrowing above the LCST, or some other emission characteristic of interest, such as line center emission strength, can be detected by a remote detector assembly 14, such as the one discussed above. The capsules 10 may also be dispersed into binders to create coatings 16, such as paints that can be applied to a surface of an object by brushing, spraying, spin-coating, or by any other suitable process. The capsules 10 may also be dispersed into binders to create coatings such as inks. The binder could be water-based, or epoxy-based, or it may be based on any suitable material that is compatible with the material forming the capsules 10.

In another embodiment the capsules 10 may be disposed between two thin sheets of a polymer or a glass, or the capsules could be eliminated and only the contents of the capsules 10 could be disposed between the two thin sheets of a polymer or a glass. In either embodiment one surface can be coated with an adhesive, resulting in a stick-on patch or structure for placing on an object of interest, enabling the remote monitoring of the temperature of the patch.

LCST solutions and polymer blends have been previously suggested for use in displays where pixel scale heating elements can turn on the material from clear to white either in solid, liquid, or microencapsulated forms. Reference in this regard may be had to Siol, W. (Roehm GmbH Chemische Fabrik, Darmstadt, Fed. Rep. of Germany, U.S. Pat. No. 4,722,595, 1988).

Referring to FIG. 5, the combination of a temperature tunable random laser (TTRL) 20, in accordance with these teachings, and an optical bandpass filter 22 (e.g., one that is 5 nm wide) provides a pixel having a ten to one change in output intensity under a constant energy excitation condition. Such a pixel may be created with an output that can be switched by a change in temperature between, for example, 44° C. and 48° C., provided by a pixel heating element 24 (e.g., a resistive or an inductive or an optically based thermal energy source). The modulation of the lasing output through the filter 22 is the result of a combination of linewidth collapse, as well as an intensity increase of the unfiltered random laser output. In other embodiments the thermal energy source could comprise a cooler as opposed to a heater.

Other applications for and embodiments of this invention may occur to those skilled in the art when guided by these teachings, and thus these further applications and embodiments will all fall within the scope of this invention. Furthermore, these teachings are not limited for use with only the specific materials discussed above. For example, any of a number of different types of dyes could be used besides red dye, including orange, yellow, green and blue dyes. Other dyes and substances that emit in the non-visible region, such as in the UV, near-IR and IR, may also be employed. Furthermore, in other embodiments the optical gain medium may include other than a laser dye, such as semiconductor particles or particles of certain polymers.

Further, while described above in the context of LCST materials systems, it is noted that this invention may be practiced as well using Upper Critical Solution Temperature (UCST) materials, so long as the optical gain medium, such as a laser dye, can be effectively combined with the UCST material. While a LCST material may be characterized as a polyblend system wherein a "cloud point" occurs upon heating, i.e., as the temperature is increased a temperature threshold is passed at which the polyblend re-separates into two mutually incompatible polymer phases, the UCST material is characterized by exhibiting a phase separation in a polyblend system at a lower temperature, and development of miscibility (formation of a single phase) at a higher temperature. Reference with regard to UCST materials can be made to, as an example, U.S. Pat. No. 4,965,783, Siol et al., incorporated by reference herein. The LCST and UCST materials may be referred to herein collectively as Critical Solution Temperature (CST) materials.

For example, and referring again to FIG. 4, the coating or layer or structure 16 could contain capsules 10 that comprise a UCST material in combination with an optical gain medium comprised of, for example, a laser dye, semiconductor particles or certain fluorescent polymers. Alternatively, the coating or layer or structure 16 could contain first capsules 10 that comprise the LCST material in combination with an optical gain medium comprised of, for example, a laser dye, semiconductor particles or certain fluorescent polymers, as well as second capsules 10A that comprise the UCST material in combination with an optical gain medium comprised of, for example, a laser dye, semiconductor particles or certain fluorescent polymers. The capsules 10 and 10A could contain the same optical gain medium and emit the same wavelengths, or they could contain different optical gain medium and emit different wavelengths. In either case there may then at least two different thresholds of laser-like emission as a function of temperature. For example, the coating 10 may emit a spectrally and temporally collapsed laser-like emission of wavelength $\lambda_1$ above the LCST temperature $T_1$ of the LCST material, and may emit a spectrally and temporally collapsed laser-like emission of wavelength $\lambda_2$ below the UCST temperature $T_2$ of the UCST material. The detector assembly 14 is assumed to be responsive to both $\lambda_1$ and $\lambda_2$, or two different detector assemblies could be used. In this embodiment, and depending on the natures of the optical gain medium in capsules 10 and 10A, the laser source 12 may be tunable, or a plurality of laser sources may be employed.

What is claimed is:

1. A random laser, comprising a container containing an optical gain medium in combination with at least one CST material, said random laser, when pumped by an external source, having an emission that exhibits laser characteristics only when a temperature within said container is in a predetermined relationship with a CST of the CST material.

2. A random laser as in claim 1, where said container is comprised of a capsule have a size of microns or tens of microns.

3. A random laser as in claim 2, where there are a plurality of said capsules disposed within a coating upon an object.

4. A random laser as in claim 1, and further comprising an optical filter through which said emission passes.

5. A random laser as in claim 1, where said gain medium comprises a laser dye, and the CST material comprises an aqueous hydroxypropyl cellulose (HPC) system and functions as an LCST system.

6. A method for remotely sensing the temperature of an object, comprising steps of:
providing the object with a random laser action medium, said medium comprising an optical gain medium and a CST material and exhibiting a dependence of laser emission upon temperature;
interrogating the object by irradiating the random laser action medium with a laser beam for inducing an emission from the random laser action medium;
detecting the emission; and
correlating at least one characteristic of the emission with temperature of the object.

7. A method as in claim 6, where the emission characteristic comprises linewidth.

8. A method as in claim 6, where the emission characteristic comprises emission strength.

9. A method as in claim 6, where the emission characteristic comprises line center emission strength.

10. A method as in claim 6, where said gain medium comprises a laser dye, and the CST material comprises an aqueous hydroxypropyl cellulose (HPC) system and functions as an LCST system.

11. A temperature sensitive coating material, comprising a binder and a plurality of capsules disposed within said binder, each of said capsules functioning as a random action laser and comprising an optical gain medium in combination with a CST material, said random action lasers, when pumped by an external source, having an optical emission characteristic that exhibits laser characteristics only when a temperature within said container is in a predetermined relationship with a CST of the CST material.

12. A temperature sensitive coating material as in claim 11, where said capsules have a size of microns or tens of microns.

13. A temperature sensitive coating material as in claim 11, where said gain medium comprises a laser dye, and the CST material comprises an aqueous hydroxypropyl cellulose (HPC) system and functions as an LCST system.

14. A temperature sensitive coating material as in claim 11, where the emission characteristic comprises linewidth.

15. A temperature sensitive coating material as in claim 11, where the emission characteristic comprises emission strength.

16. A temperature sensitive coating material as in claim 11, where the emission characteristic comprises line center emission strength.

17. A display comprised of a plurality of pixels, each pixel comprising an optical gain medium in combination with a CST material that when pumped by an optical source has an emission that exhibits a change in an emission characteristic as a function of temperature, further comprising a thermal energy source for varying the temperature of each pixel individually to be above or below the CST of the CST material depending on whether the pixel is intended to be on or off.

18. A display as in claim 17, where the emission characteristic comprises linewidth.

19. A display as in claim 17, where the emission characteristic comprises emission strength.

20. A display as in claim 17, where the emission characteristic comprises line center emission strength.

21. A method for operating a random laser action medium, comprising:
providing said medium to comprise an optical emitter material and a CST material;
illuminating said medium with pump light for causing said optical emitter to emit photons; and
reversibly controlling the photon scattering length and the photon diffusion time in the medium in accordance with the temperature of the medium for controlling an optical emission characteristic of the medium.

22. A method as in claim 21, where the emission characteristic comprises linewidth.

23. A method as in claim 21, where the emission characteristic comprises emission strength.

24. A method as in claim 21, where the emission characteristic comprises line center emission strength.

25. A method as in claim 21, further comprising detecting the emission characteristic, and correlating the detected emission characteristic with the temperature.

26. A method as in claim 21, further comprising remotely detecting the emission characteristic, and determining whether the temperature is above or below the CST from the detected emission characteristic.

27. A method as in claim 21, where the steps of providing, illuminating and reversibly controlling occur on a pixel-by-pixel basis in a display device.

28. A method as in claim 21, where said optical emitter material comprises a laser dye, and said CST material comprises an aqueous hydroxypropyl cellulose (HPC) system.

* * * * *